July 7, 1931.  J. F. CHAPPELL  1,813,382
OIL LEVEL INDICATING APPARATUS
Filed April 26, 1926  3 Sheets-Sheet 1

Inventor
James F. Chappell,
By
Attorneys

July 7, 1931.  J. F. CHAPPELL  1,813,382
OIL LEVEL INDICATING APPARATUS
Filed April 26, 1926  3 Sheets-Sheet 2
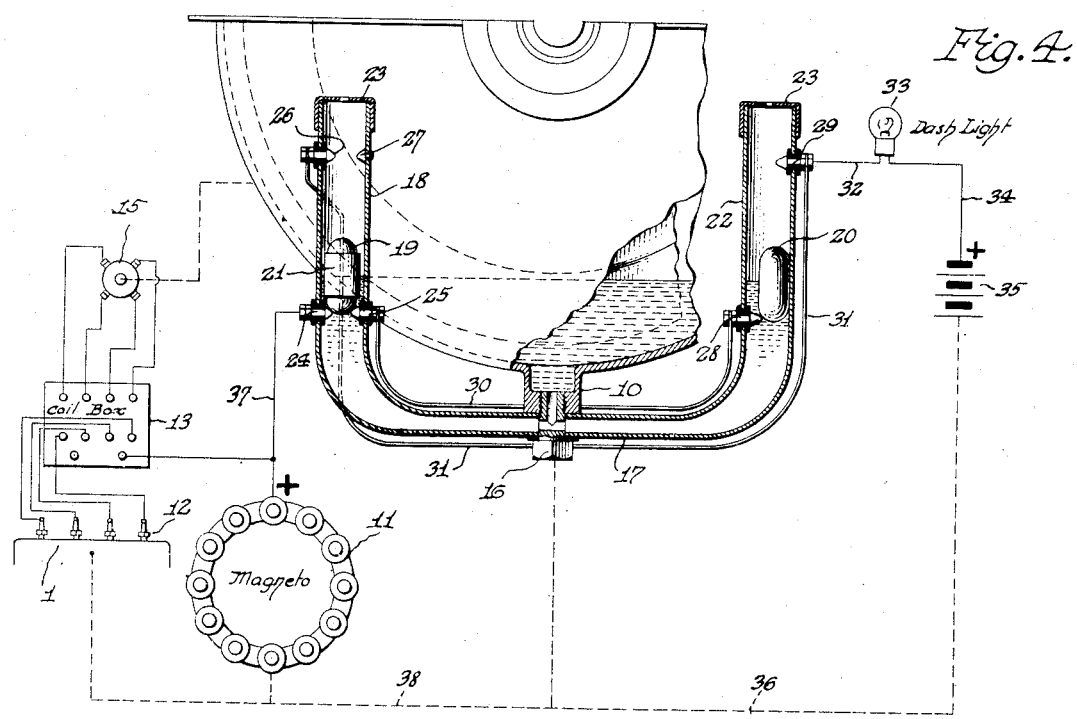
Fig. 4.
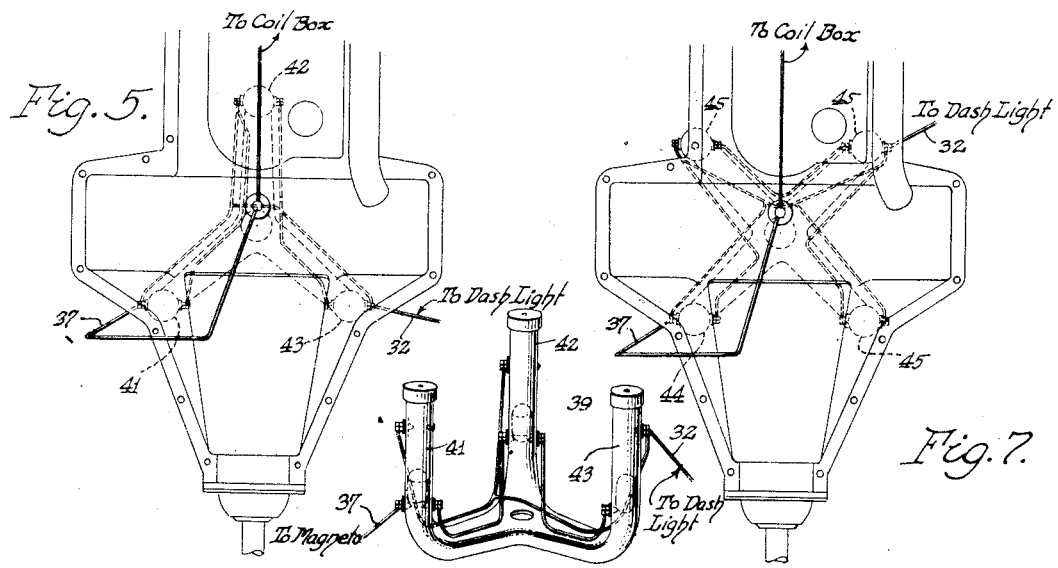
Fig. 5.  Fig. 7.
Fig. 6.
Inventor
James F. Chappell,
By
Attorneys July 7, 1931.  J. F. CHAPPELL  1,813,382
OIL LEVEL INDICATING APPARATUS
Filed April 26, 1926   3 Sheets-Sheet 3

INVENTOR.
JAMES F. CHAPPELL
BY
ATTORNEY.

Patented July 7, 1931

1,813,382

UNITED STATES PATENT OFFICE

JAMES F. CHAPPELL, OF WINDSOR, ONTARIO, CANADA

OIL LEVEL INDICATING APPARATUS

Application filed April 26, 1926. Serial No. 104,580.

This invention relates to an oil level indicating apparatus especially designed for the automotive industry and applicable to such motor driven vehicle as have oil containers which must be replenished from time to time. A fair example of an oil container is the crank case of an engine or transmission casing, either having a drain connection by which used oil, sediment and foreign matter may be removed from the casing.

My invention aims to provide a level indicating apparatus that may be easily and quickly installed on a vehicle to indicate to the operator of the vehicle when the supply of oil is very low, and permit of the operator immediately replenishing the supply. The apparatus includes an auxiliary multi-arm container which may be attached to the drain connection of a crank or transmission casing or any suitable outlet to thereby receive oil. In the auxiliary container are floats or buoyant bodies adapted to engage contact members in a magneto or ignition circuit of an internal combustion engine, so that the circuit will be short circuited and cause a cessation in the operation of the engine, thereby indicating to the operator of the vehicle that the oil should immediately be replenished.

The apparatus also includes an electric indicator, in circuit with a suitable source of energy and other contact members carried by the auxiliary container, so that when a circuit is completed, the operator will know that a sufficient quantity of oil has been supplied to the auxiliary container.

The apparatus also includes an oil supply tank connected to the breather or some other inlet connection of the engine crank case, and the supply of oil may be controlled by the operator of the vehicle from the dash or instrument board thereof. This auxiliary supply of oil will permit of the vehicle operator immediately transferring a quantity of oil to the engine crank case when a low level signal has been indicated on the dash or instrument board.

The multi-arm auxiliary oil container has been designed as an accessory operable under all road conditions of a vehicle, the arrangement of arms being such that endwise or sidewise tilting or angularity of the vehicle will not cause any interruption in the operation of the vehicle, unless there is a low level of oil. This is brought about by the novel arrangement of floats and contact members which necessitates substantially a horizontal level of oil or an extremely low level before the apparatus will function as an indicator.

My invention will be hereinafter specifically described and then claimed, and reference will now be had to the drawings, wherein Figure 1 is a diagrammatic side elevation of an internal combustion engine adapted to form part of a motor vehicle, the engine being equipped with a two-arm auxiliary oil container;

Fig. 4 is a vertical sectional view of the apparatus in connection with a portion of an engine, showing diagrammatically the ignition system of the engine;

Fig. 5 is a view somewhat similar to Fig. 3, showing an auxiliary three-arm oil container;

Fig. 6 is a perspective view of a detached three-arm container;

Fig. 7 is a view similar to Fig. 3 showing a four-arm auxiliary container, and

Figures 1, 2, 3:
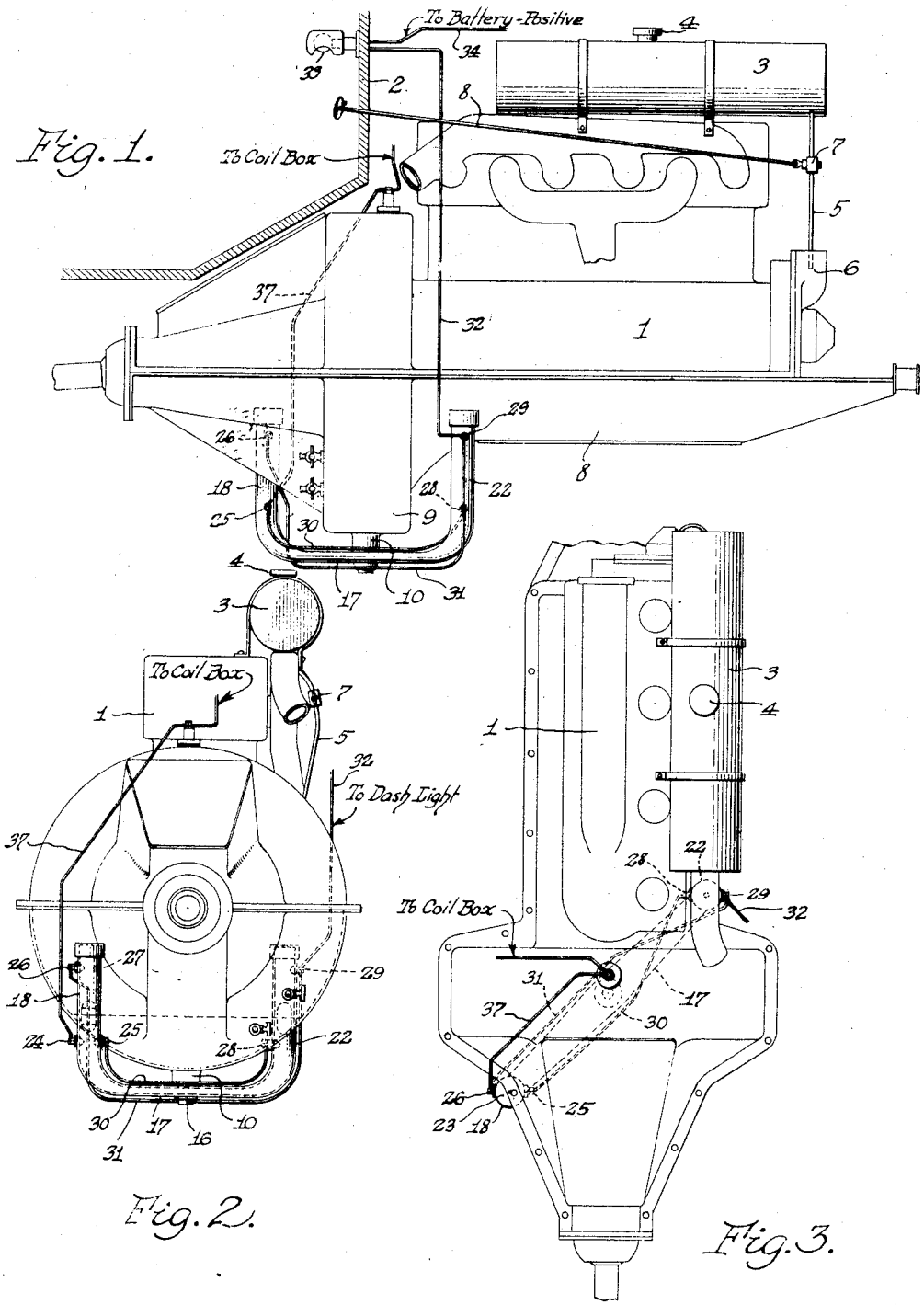
Fig. 2 is a rear elevation of the same.
Fig. 3 is a plan of the engine provided with a portion of the apparatus.
Figure 8:
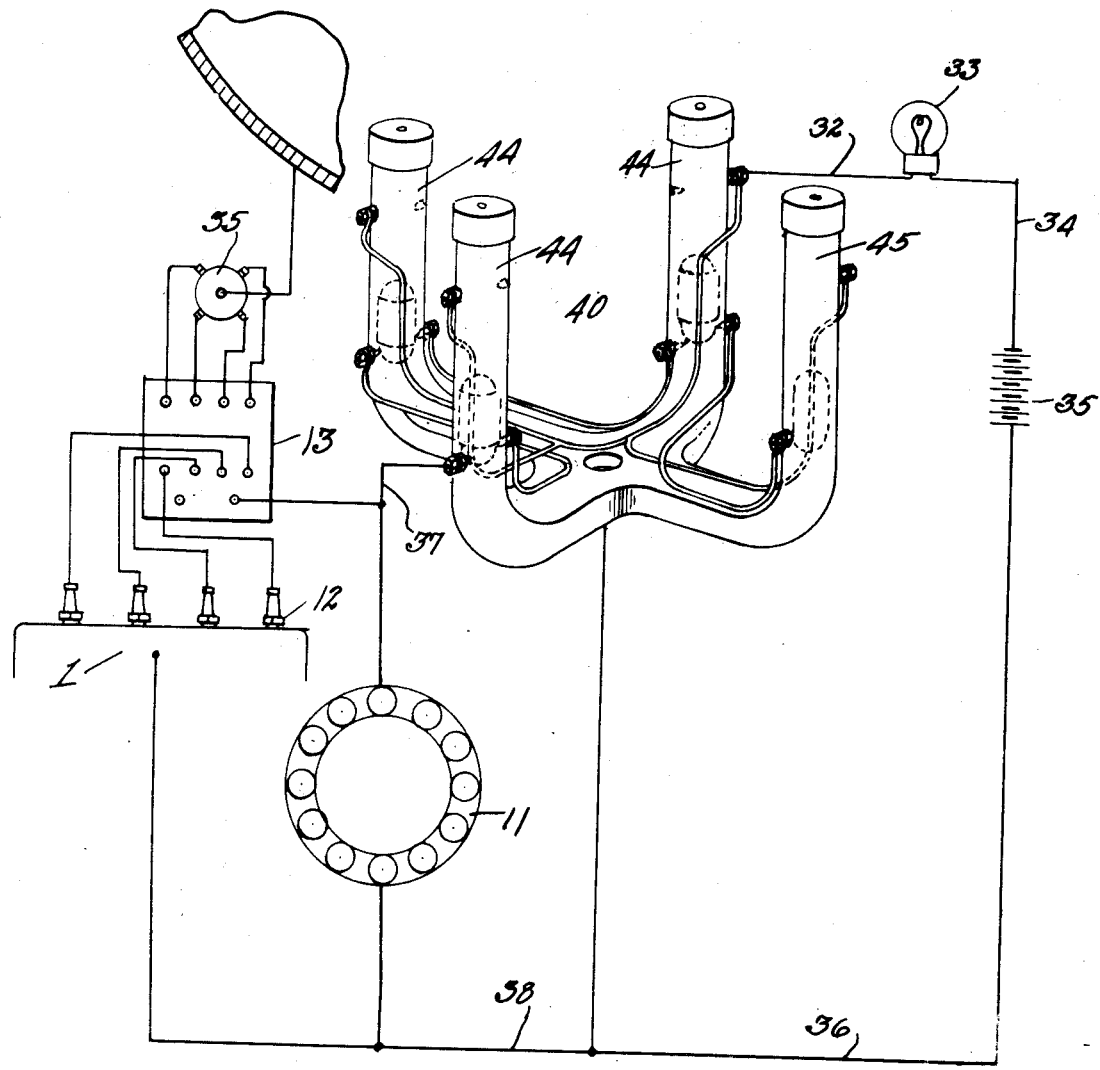
Fig. 8 is a perspective view of a detached four-arm container.

Reference will first be had to Figs. 1 and 4 inclusive showing an internal combustion engine 1 in proximity to a dash or instrument board 2 and suitably mounted on the engine or supported in proximity thereto is an oil supply tank 3 having a filling connection 4 and an outlet connection 5, said outlet connection extending into the breather 6 of the engine. The connection 5 includes a conventional form of valve 7 having a rearwardly extending rod 8 supported from the dash 2 so that the valve 7 may be opened or closed by the operator of the automobile to control the supply of oil to the crank case 8 or transmission casing 9 of the engine. Obviously the engine 1 is a fair example of many types having a well or container for oil and ordinarily there is a plugged or valved drain connection 10. The engine also has an ignition system including a magneto 11, spark plugs 12, a coil box 13, and a timer 15 all electrically connected and suitably grounded.

My invention resides in removing the usual plug or valve of the drain connection 10 and substituting therefor a ported bolt or connecting member 16 adapted to support a container 17 in engagement with the drain connection 10 to receive oil therefrom. The container is substantially U-shaped in elevation so as to provide opposed vertical arms 18 and 22. This container may be conveniently made of tubing or piping bent to afford the desired configuration and capacity for oil. The arms 18 and 22 communicating with the drain connection 10 are adapted to receive oil therefrom with the level of oil in the arms substantially the level of the oil within the engine casing, and in the arms 18 and 22 are oval floats or buoyant bodies 19 and 20. The float 19 has an insulator 21 so that it cannot electrically contact with the wall of the arm 18.

The upper ends of the arms 18 and 22 are closed by detachable apertured caps 23, and in the walls of the arm 18 are sets of opposed contacts adapted to be engaged by the float 19, while in the arm 22 are two contacts adapted to be engaged by the float 20. Considering the arm 18, the lower contacts 24 and 25 are insulated from the arm and the upper contacts 26 and 27 are spaced a sufficient distance from the lower contacts 24 and 25 to represent a volume of oil in the engine casing. The upper contact 26 is insulated from the arm 18, but the other contact 27 need not be insulated because the container forms part of an electrical circuit.

In the arm 22 the lower contact 28 and the upper contact 29 are insulated from the arm walls with the contact 29 on the opposite wall from the contact 28, mainly for the convenience of electrically connecting the contacts. The contacts 25 and 28 are connected by a wire 30, and the contacts 26 and 29 by a wire 31. The contact 29 is connected by a wire 32 to an incandescent lamp 33 on the dash or instrument board 2 of the automobile and said lamp is connected by a wire 34 to a battery 35. This battery and the container 17 may have suitable ground connections, as at 36.

The contact member 24 is connected by a wire 37 to the magneto circuit, which includes ground connection 38.

As shown in Fig. 4 the indicator circuit for the lamp 33 is broken, but a circuit is completed by the float 19 engaging the opposed contact members 24 and 25 so that the magneto is short circuited, thus interrupting the ignition system of the engine 1. This condition indicates that there is a low level of oil in the engine casing and that the supply should be immediately replenished. The operator of the vehicle therefor opens the valve 7 and admits oil to the engine from the tank 3. As the level of oil is raised within the arms 18 and 22 the magneto circuit is again established and in addition to this circuit the float 20 will evenly connect the wall of the arm 22 with the contact member 29, thereby completing the circuit for the lamp 33 which will indicate to the operator of the vehicle that the valve 7 should be closed, as a sufficient quantity of oil has been admitted to the engine casing.

Either of the floats 19 or 20 may establish the indicator circuit and this is because the vehicle may be sidewise tilted, for instance on the side of a road where one side of the engine will be lower than the other. By referring to Fig. 3, it will be noted that the vertical plane of the container 17 intersects the longitudinal vertical plane of the engine and it is preferable to so position the container 17 so that the arm 22 will be considerably in advance of the arm 18. This permits of the container 17 serving its purpose when the vehicle is on a grade with one end of the engine at a higher level than the other. Making the apparatus more sensitive in this respect is a three-arm container 39 or a four-arm container 40. The arms 41, 42 and 43 of the container 39 may be comparatively short so that this three-arm container may be placed, as shown in Fig. 5, with one of its arms in the vertical plane of the engine and the other two arms extending rearwardly at the opposite sides of the plane of the engine. The arms 41 and 42 are equipped with contacts similar to the arm 18 and the arm 43 has contacts similar to the arm 22, with all contacts operatively connected for the ignition and indicator circuits, as previously described.

The four-arm container 40 has three of its arms 44 provided with contact members similar to the arm 18 or the arms 41 and 42, while the remaining arm 45 of the container 40 has contact members similar to the arm 22 or the arm 43. In other words, there are one or more arms associated with the ignition circuit and in each instance a single arm in connection with the indicator circuit. As shown in Fig. 7 the four-arm container 40 is positioned so that there will be two arms on each side of the vertical longitudinal plane of the engine and it is these multi-arm containers that render the apparatus very sensitive and operable under various road conditions of the vehicle.

From the foregoing it will be observed that when either float is raised the lamp will be illuminated, and that when all of the floats are lowered the motor will be stopped. This is along the lines of my invention disclosed in Patent No. 1,566,182 granted Dec. 15, 1925, but the present invention provides an indicating apparatus that is applicable to various automobiles without any material changes or modifications.

What I claim is:—

1. The combination with an oil containing casing of an internal combustion engine having an oil outlet at its bottom, comprising in a unitary structure, a series of more than two vertically positioned tubular members united at the bottom by integral horizontal portions commonly connected to the said oil outlet, said vertical portions of the tubular members being positioned on opposite sides of the longitudinal axis of the casing and spaced practically equal angular distances apart about an axis parallel to the said tubular portions, an electric circuit having a translating device therein and terminals in the interior of the said vertical portions, a float element in each of the said vertical portions for engaging the terminals whereby the circuit cannot be closed except by the floats contacting like positioned terminals in each of the said vertical portions.

2. An oil level indicating device comprising the combination with an oil containing casing of an internal combustion engine having an oil outlet in its bottom, of an oil level indicating device comprising a series of more than two vertically positioned tubular members commonly connected together at the lower end to the oil outlet, the said vertical portions being disposed on opposite sides of the longitudinal axis of the casing and spaced equal angular distances apart about an axis parallel to the said tubular portions, an electric circuit having terminals in the said vertical portions, a second electrical circuit having terminals in the said vertical portions at a higher level than the first mentioned terminals, contacting means for the said terminals comprising floats in each of the said vertical portions adapted to complete either of the said circuits when the oil level in the said vertical portions is sufficiently high or low to permit the floats to contact the respective terminals.

3. The combination with an oil containing casing of an internal combustion engine having an oil outlet in its lowermost portion, of an oil level indicating device comprising a multi-arm container including a series of four hollow vertical portions and integral horizontal connecting portions together united at a common center opening to the said oil outlet of the casing and spaced practically equal angular distances apart about an axis parallel to the said tubular portions, the said vertical portions being disposed in pairs on opposite sides of a longitudinal and transverse line of the casing, an electric circuit having terminals extending into the said vertical portions of the container and a second circuit also having terminals in the said vertical portions at a higher level than the first named terminals, a float in each of the said vertical portions of the container of a character to contact the terminals and close either of the circuits when the floats are at a level to contact the terminals of the respective circuits.

In testimony whereof I affix my signature.

JAMES F. CHAPPELL.